US008902179B1

(12) United States Patent
Ota

(10) Patent No.: US 8,902,179 B1
(45) Date of Patent: Dec. 2, 2014

(54) METHOD AND DEVICE FOR INPUTTING TEXT USING A TOUCH SCREEN

(75) Inventor: Tetsu Ota, Sagamihara (JP)

(73) Assignee: Life Labo Corp., Sagamihara, Kanagawa (JP)

( * ) Notice: Subject to any disclaimer, the term of this patent is extended or adjusted under 35 U.S.C. 154(b) by 504 days.

(21) Appl. No.: 13/189,774

(22) Filed: Jul. 25, 2011

Related U.S. Application Data

(60) Provisional application No. 61/367,577, filed on Jul. 26, 2010.

(51) Int. Cl.
*G06F 3/041* (2006.01)
(52) U.S. Cl.
USPC .......................... 345/173; 345/156; 345/174
(58) Field of Classification Search
CPC .................................. G06F 3/04883
USPC ......................................... 345/173
See application file for complete search history.

(56) References Cited

U.S. PATENT DOCUMENTS

| | | | |
|---|---|---|---|
| 2003/0063073 A1* | 4/2003 | Geaghan et al. | 345/173 |
| 2006/0055669 A1* | 3/2006 | Das | 345/156 |
| 2007/0052682 A1 | 3/2007 | Kang | |
| 2008/0291171 A1 | 11/2008 | Shin | |
| 2009/0262090 A1* | 10/2009 | Oh | 345/173 |

* cited by examiner

*Primary Examiner* — Gerald Johnson

(57) ABSTRACT

A mobile device-implemented method for providing a user of a mobile device having a touch screen a function to input a code into the mobile device among candidate codes, wherein the candidate codes are divided into a plurality of code series, the method comprising: (A) providing in the touch screen a first flick area, which is located in a ⅓ side area at a side of a first lateral side of the touch screen, wherein each of the plurality of code series is associated with a corresponding flick action at the first flick area; (B) providing in the touch screen a second flick area, which is located in a ⅓ side area at a side of a second lateral side of the touch screen; (C) detecting a first flick action at the first flick area to determine the code series; (D) detecting a second flick action at the second flick area. (G) determining a code to be inputted into the mobile device from a combination of the determined code series and the second flick action.

7 Claims, 19 Drawing Sheets

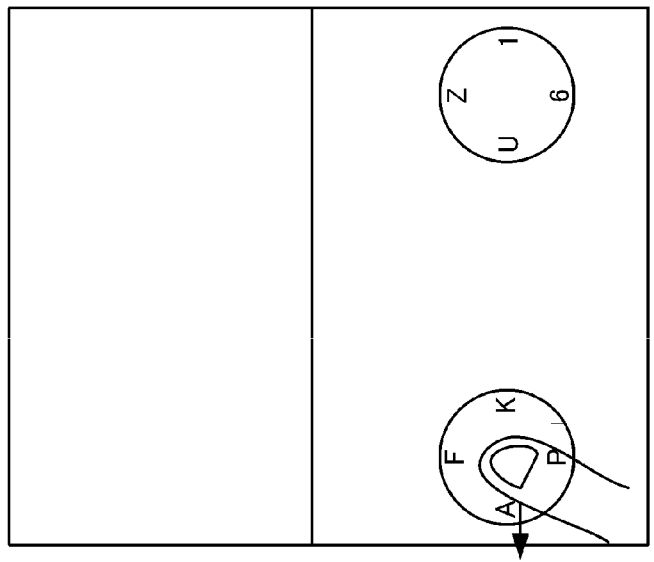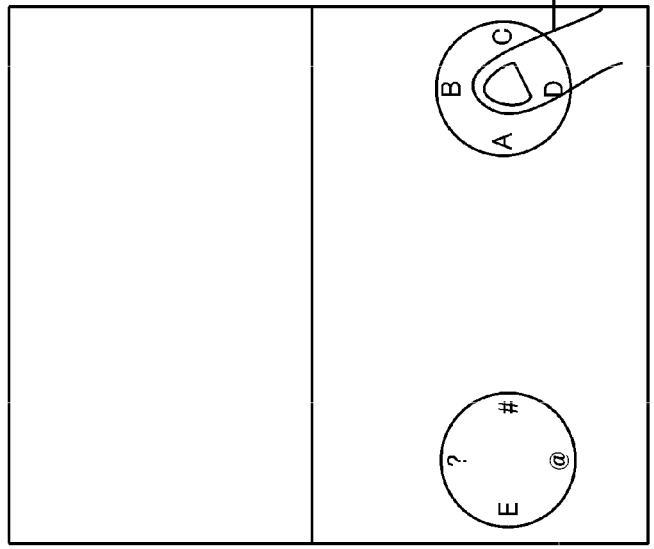
Fig. 6

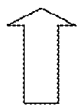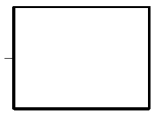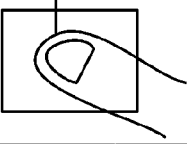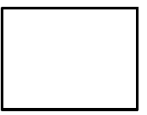
Fig. 7

METHOD AND DEVICE FOR INPUTTING TEXT USING A TOUCH SCREEN

CROSS-REFERENCE TO RELATED APPLICATIONS

This application claims benefit of a Provisional Application No. 61/367,577, filed on Jul. 26, 2010.

FIELD OF THE INVENTION

The present invention relates to a method and a device for inputting text using a touch screen in an information processing device, such as a mobile phone.

BACKGROUND ART

Information processing devices, such as mobile phones, that use a touch screen for inputting text have become popular.

Conventional methods for inputting text using a touch screen include "toggle" and "flick".

The toggle method is relatively easy to master but relatively slow to input text. In the toggle method, the user touches a first-touching area, that is, a sectioned area in the touch screen, for determining a character series, such as a series including A, B and C. After that, the user touches the sectioned area one to several times or not touches any area to determine which character to input. The flick method allows faster text input than the toggle method if used by a user who has mastered it. The flick method is shown in FIG. 19. In the flick method, the user touches one of flick areas 41P for determining a character series, such as a series including A, B and C. Then, the device displays an assist display 44P. Finally, the user performs a flick action, which is an action that moves the finger or tap the touch screen with the finger. The flick action corresponds to a character. If the user performs an up flick action, B is determined in FIG. 19B.

However, when inputting text using the above methods, the user needs to look at the screen for finding the area (flick area 41P) to touch first.

An objective of the present invention is to provide a method for inputting text in a touch screen that enables fast input and easy-to-master, as well as a lower degree of the need to look into the screen during the input.

SUMMARY OF THE INVENTION

The mobile device-implemented methods of the present invention have steps as described in the claims. The methods can be used in a mobile device, which can be held by the user's hands. An aspect of the invention is directed to a mobile device-implemented method for providing a user of a mobile device having a touch screen a function to input a code into the mobile device among candidate codes, wherein the candidate codes are divided into a plurality of code series, the method comprising:

(A) providing in the touch screen a first flick area, which is located in a ⅓ side area at a side of a first lateral side of the touch screen;

(B) providing in the touch screen a second flick area, which is located in a ⅓ side area at a side of a second lateral side of the touch screen at opposite side to the first lateral side;

(C) detecting a first flick action at the first flick area or the second flick area to determine the code series;

(D) detecting a second flick action at the first flick area or the second flick area; and (E) determining a code to be inputted into the mobile device from a combination of the determined code series and the second flick action.

BRIEF DESCRIPTION OF THE DRAWINGS

FIG. 6 shows touch display arrangements in accordance with another embodiment using a four directions approach.

FIG. 7 shows touch screen arrangements according to another embodiment.

FIG. 15 shows examples of initial handwriting actions.

DETAILED DESCRIPTION OF THE INVENTION

The present invention will be described with reference to the drawings. Identical or similar elements are numbered the same or similar numbers.

(1) Mobile Device

Figure 1:
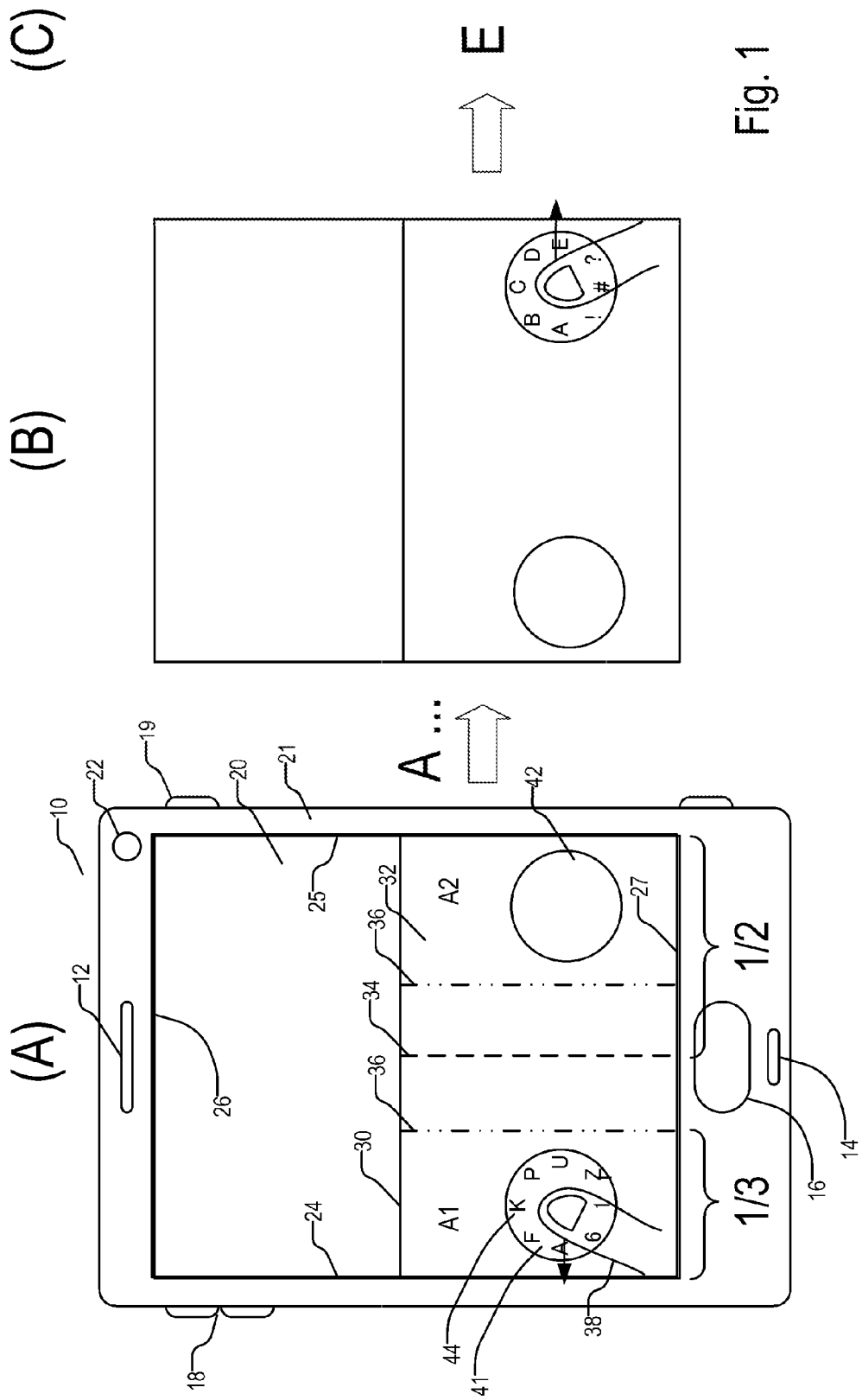
FIG. 1 shows top views of a mobile device in accordance with an embodiment of the invention.

FIG. 1 shows top views of a mobile device and touch screen arrangements in accordance with an embodiment of the invention. FIG. 1A shows details of the mobile device when an input panel is initiated.

The mobile device 10 has a function of a phone and wireless data communications, such as sending and receiving SMS messages and e-mails. In addition, the mobile device has a function of a word processor, scheduling, spreadsheet, web browsing, and so on.

Examples of the mobile device 10 for which the present invention may be implemented include iPhone 4, iPod Touch and iPad released by Apple Computer Inc. and HTC Desire released by HTC Corp.

The invention may be implemented by software developed using software development kits (SDKs) available from Apple Computer Inc. or Google Inc., building an OS image, or ASICs designed using hardware description languages.

The mobile device 10 has a speaker 12, a microphone 14, a home hardware button 16, up and down hardware buttons 18, a power/sleep hardware button 19, and a touch screen display 20 installed inside a frame 21.

In addition, the mobile device has a camera 22 and a 3 axis gyro sensor (not illustrated), which can detect three-dimensional orientation of the mobile device 10.

(2) Touch Screen

On substantially all area of the touch screen 20, a touch sensor sheet is adhered on the touch sensor display base for detecting motions of the user's finger or stylus on the touch sensor sheet.

The touch screen 20 is substantially rectangle in shape and has two lateral sides 24, 25 at left and right and two horizontal sides 26, 27 at top and bottom. The touch screen 20 may be at a lower level, that is, depressed, than the frame 21 of the touch screen 20 so as to protect the touch screen 20 from damages, as in HTC Hermes released by HTC Corp. Alternatively, the touch screen 20 and the frame 21 may be at the same level and formed uniformly. In the touch screen 20, there are a first flick area 41 in a first ⅓ side area A1 and a second flick area 42 in a second ⅓ side area A2.

When inputting text, it is advantageous if the user uses both the left and right hands in order to input text fast as in FIGS. 2A and 2B. Also, it is advantageous if the user held the mobile device 10 with both the left and right hands and touching the touch screen 20 with two thumbs of both hands. This is because the user can easily use the two thumbs simultaneously or partly simultaneously compared to the case when the user uses two fingers of one hand at the same time. One reason for this is that, when two thumbs are used, left brain is used for moving right hand thumb and right brain is used for moving left hand thumb, and therefore, the brain is efficiently used by working in parallel.

Figure 2:
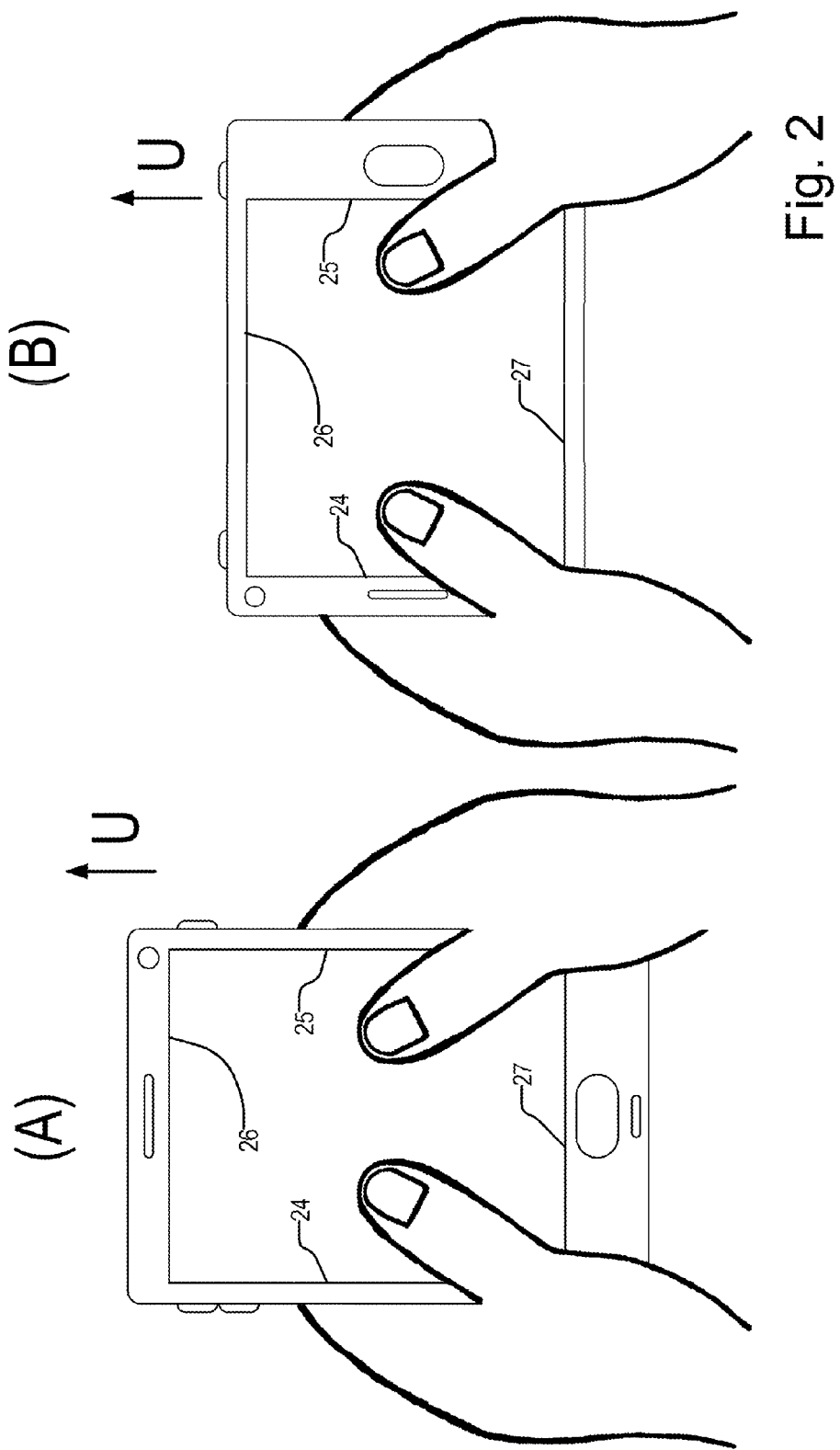
FIG. 2 shows a top view of the mobile device when held by the user at both hands.

FIG. 2 shows a top view of the mobile device when held by the user at both hands. The user may use the mobile device in its normal direction (FIG. 2A) but the user may also use it in its horizontal direction (FIG. 2B), which is a direction rotated 90 degrees from its normal direction (FIG. 2A). In the latter case, an upper direction is the direction U and lateral sides are sides 24, 25 in FIG. 2B, and the first ⅓ side area A1 and the second ⅓ side area A2 move to the sides of the touch screen in FIG. 2B. Embodiments of the invention will be illustrated for the mobile device 10 in its normal position but it can be understood that the invention can be used in its horizontal direction also.

(3) Input Panel

Returning back to FIG. 1A, usually, application software uses all area of the touch screen 20. When the application software is available for inputting text, a horizontal border 30 appears in the touch screen 20 and the screen of application software is made smaller to be formed in an upper part, which is above the horizontal border 30. This application software accepts text input from the user. Examples of such application software include SMS and e-mail messaging software, telephone call handling software, word processing software, a text editor, scheduling software, a remote controller, and the like.

Below the horizontal border 30 of the touch screen 20, an input panel 32, which provides to the user a function to input text in this mobile device 10, is displayed.

(4) Text Input Feature

In the mobile device 10, the inventor has noticed that it is very important to achieve the following features regarding text input:

(1) capability to input text fast
(2) easy to master how to input
(3) low level of the need to look into the screen during the text input operation Regarding the feature (3), if the user has to look into the touch screen 20 all the time during the text input operation, even though the mobile device 10 accomplishes features (1) and (2), the user gets tired, and furthermore, it is difficult to do other things while inputting text, such as looking forward when walking.

The present invention intends to achieve all of the above (1) to (3) features, especially, (3).

In some conventional mobile devices that have hardware buttons to input text instead of a touch screen 20, it is not very difficult to input text without looking into the screen. This is because the user can recognize the border between a button and another button with user's fingers.

Figure 19:
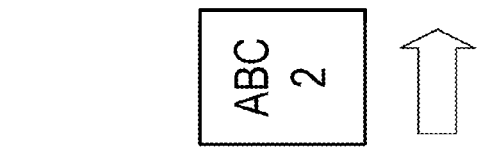
FIG. 19 shows a screen of a conventional mobile phone.

However, as shown in FIG. 19, in a conventional mobile device that uses a touch screen 20P to input text, the user needs to look into the screen at a high level during the text input operation. The main reason for this is that the user cannot recognize borders between sections (buttons) of the touch areas 41P with the user's finger because there are no roughness (unevenness) that the user can recognize with the finger in the touch screen 20P as compared to conventional mobile devices that have hardware buttons. The above problem that the user needs to look into the screen at a high level during the text input operation occurs also because many sections in the touch areas 41P, such as sections in the touch areas in the center of the touch screen, are located on areas difficult for the user to locate on.

(5) Eight Directions Approach

In accordance with an embodiment of the invention described in FIG. 1, the input panel 32 has a first flick area 41 in the touch screen 20, which is located in a ⅓ side area A1 at a side of the left lateral side 24 of the touch screen 20 and a second flick area 42 in the touch screen 20, which is located in a ⅓ side area A2 at a side of the right lateral side 25 of the touch screen. Herein, "a flick area, which is located in a ⅓ side area at a side of a lateral side" corresponds to locating a flick area 41, 42 in an area formed at a side of a lateral side by dividing the touch screen into three areas having the same size with two longitudinal lines (⅓ side area). Preferably, the flick area does not extend beyond a ⅓ longitudinal line 36 onto the side of the center longitudinal line 34, that is, the flick area is within a ⅓ side area A1, A2 at a side of the lateral side. This ⅓ longitudinal line 36 is important for the user to recognize the flick area with the user's fingers and to maintain a center region between the flick areas as well.

In FIG. 1A, the first flick area 41 and the second flick area 42 are located at symmetrical locations with each other centering on the center longitudinal line 34. That is, both flick areas 41, 42 are located at the same distance from the bottom side 27 of the touch screen and at the same distance from a closer lateral side 24, 25 of the touch screen 20.

Preferably, the first flick area 41 and the second flick area 42 are located at the first lateral side and the second lateral side that are at opposite sides. Alternatively, the first flick area 41 and the second flick area 42 may be located at the first lateral side and the second lateral side that are identical. In this case, the first flick area 41 and the second flick area 42 are located at the same location or near locations.

(6) Operation of Eight Directions Approach

Figure 3:
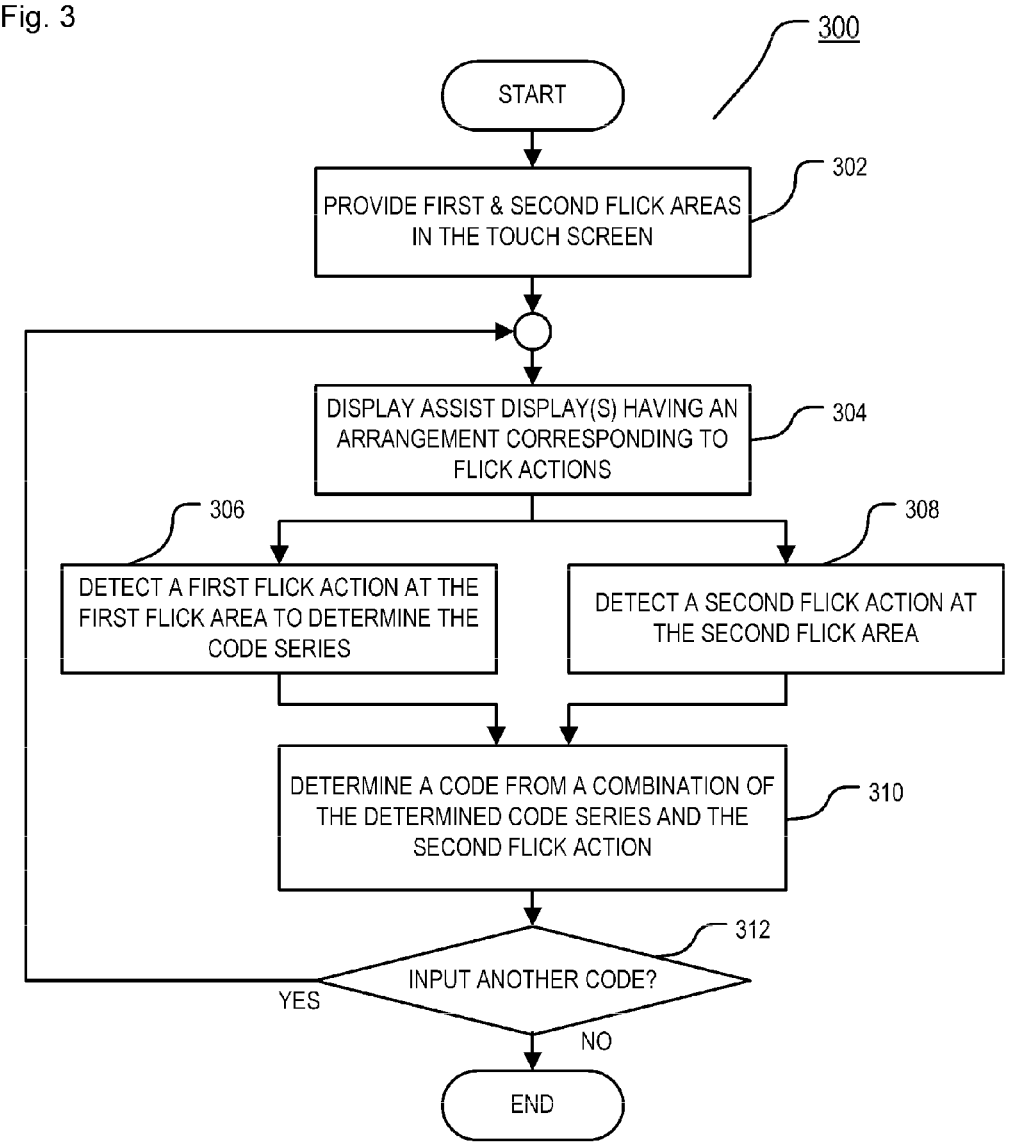
FIG. 3 shows a flow chart of a text input operation in accordance with an embodiment.

FIG. 3 shows a flow chart of a text input operation in accordance with an embodiment of the invention. The operation will be described now with reference to FIG. 3 also. After the application software initiated the input panel 32, the first flick area 41 and the second flick area 42 are displayed in the touch screen 20 (Step 302).

Around the center of the first flick area 41 where it is close to a circular border of the first flick area 41, an assist display 44 consisting of eight codes, A, F, K, P, U, Z, 1, and 6, is displayed for assisting the user to know the associations between flick actions (directions in this embodiment) and the code series (Step 304). "A code series" consists of A, B, C, D and E. "F code series" consists of F, G, H, I, and J, and so on. Preferably, a location of each codes in the assist display 44 corresponds to the meaning of its associated flick actions. That is, an arrangement of items in the assist display 44 corresponds to their associated flick actions. Generally, it is difficult to perform flick actions in eight directions. However, in the present invention, since the flick areas are respectively located in a ⅓ side area at a side of a lateral side of the touch screen, the user is able to perform the flick operations precisely.

The mobile device 10 waits for a flick action of the user at either one of the flick areas 41, 42. Then, the mobile device 10 detects a first flick action at the first flick area, enabling to determine the code series (Step 306). That is, upon detecting a fast move into a direction (left direction in this example) associated with A code series, the mobile device 10 determines that the user has selected A code series. Then, the mobile device displays another assist display consisting of A, B, C, D, E, ?, #, and ! around the center of the second flick area 42 and close to a circular border of the second flick area 42. This is for assisting the user to know the association between the codes and associated flick actions.

Next, the mobile device 10 detects a fast move of the user in a direction (right) associated with E (Step 308). Alternatively, Step 308 can be performed before Step 306. In this case, it is advantageous for a user who can move the finger independently and simultaneously. Then, the mobile device 10 determines a code from a combination of the determined code series and the second flick action (Step 310). That is, the user has selected a code "E" among codes belonging to the A code series (Step 310). The code "E" is input into application software in the mobile device. If the user desires to input another code, the process returns to Step 304 (Step 312). If not, the process ends.

Table 1 lists a combination of the code series and their associated codes.

TABLE 1

| First Flick Action | Second Flick Action | | | | |
|---|---|---|---|---|---|
| | Left | Upper Left | Up | Upper | Right |
| Left | A | B | C | D | E |
| Upper Left | F | G | H | I | J |
| Up | K | L | M | N | O |
| Upper Right | P | Q | R | S | T |
| Right | U | V | W | X | Y |
| Lower Right | Z | . | , | — | / |
| Down | 1 | 2 | 3 | 4 | 5 |
| Lower Left | 6 | 7 | 8 | 9 | 0 |

Table 2 lists an alternative combination of the code series and their associated codes.

TABLE 2

| First Flick Action | Second Flick Action | | | | |
|---|---|---|---|---|---|
| | Left | Up | Right | Down | Tap |
| Upper Left | . | , | @ | ? | 1 |
| Up | A | B | C | ! | 2 |
| Upper Right | D | E | F | / | 3 |
| Left | G | H | I | ( | 4 |
| Tap | J | K | L | — | 5 |
| Right | M | N | O | ) | 6 |
| Lower Left | P | Q | R | S | 7 |
| Down | T | U | V | & | 8 |
| Lower Right | W | X | Y | Z | 9 |
| Double Tap | 0 (with no second flick action) | | | | |

In particular to alphabets and numbers, this combination described in Table 2 is advantageous in that the user can master the association of the first flick action easily because the alphabets are associated to directions corresponding to the arrangement of conventional 3×4 buttons telephones in which a button 2 is at upper direction from the center of the buttons and alphabets A, B, and C are assigned to the button 2.

Usually, when inputting English alphabet characters, the mobile device 10 inputs lower case alphabets. When inputting upper case characters, the user touches a case changer area (not illustrated) in the input panel 32 after inputting the lower case alphabet. Alternatively, upper case alphabets may be inputted using tap & fast move 63 flick actions or other flick actions instead of fast move 61 flick actions of the same direction. In this case, the tap is similar to a shift key in keyboards for computers.

Herein, a "code" includes a character, such as an alphabet letter and a Chinese character, a character string, such as a word "this", a whole sentence, a control code character, such as "line feed" code, and a control code that is used by the software. Preferably, the "code" includes all candidate characters in a language environment used by the user, as well as character strings.

(7) Flick Operation and Flick Action

Flick operations and flick actions will be described in detail below.

Figure 4:
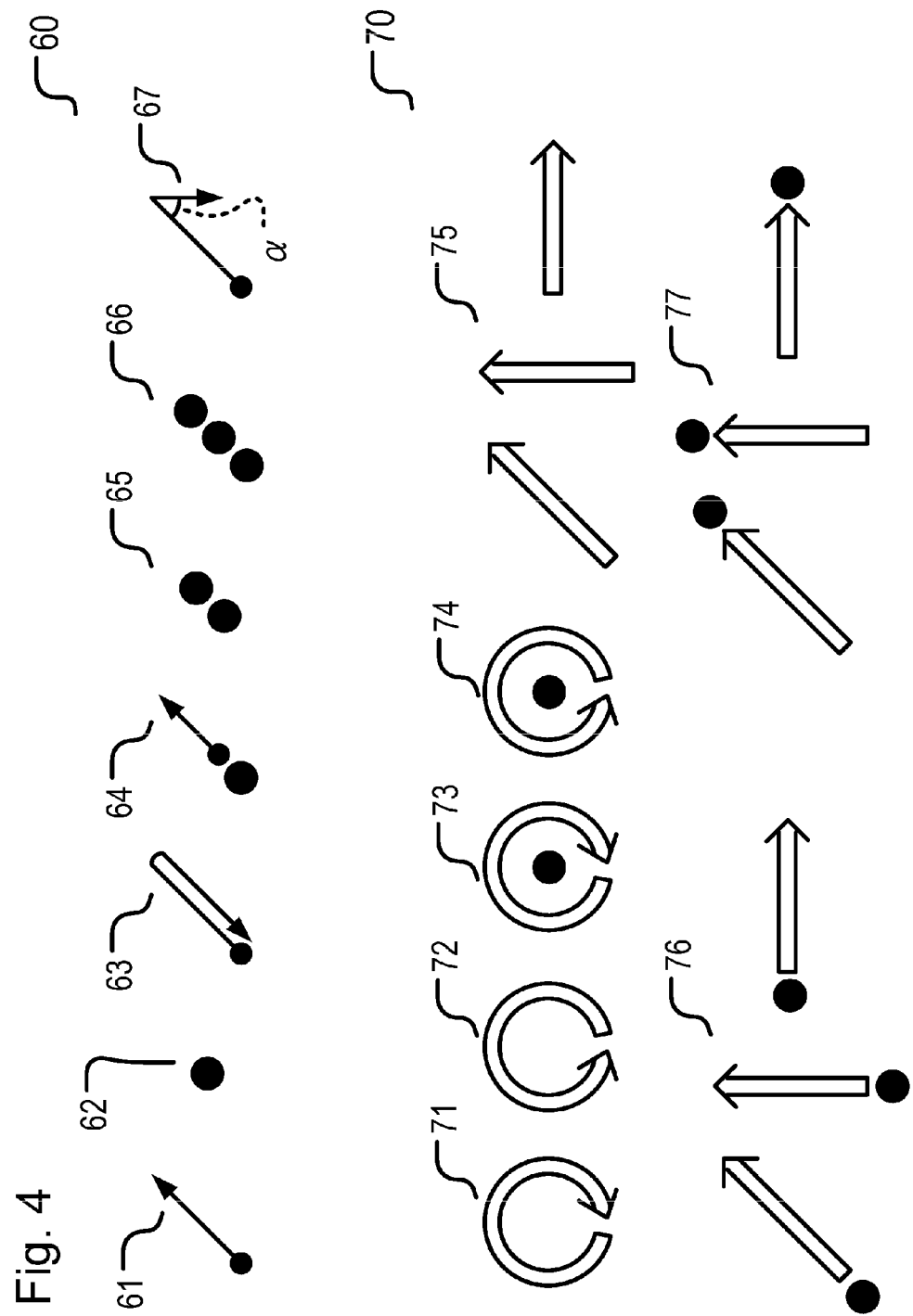
FIG. 4 lists examples of the flick operations.

FIG. 4 lists examples of the flick operations. Flick operations can be categorized into non-gradual selection-enabled flick operations 60 (listed in the first row) and gradual selection-enabled flick operations 70 (listed in the second and third rows). Both types of flick operations are considered as "a flick operation" herein.

The following describes examples of the non-gradual selection-enabled flick operations 60.

In a fast move 61, which is sometimes also referred to as "drag" or "flick" in other documents, the user puts down the finger onto the touch screen 20, moves straight to a direction, and then raises up the finger. The fast move 61 operation is done faster than a slow move 75, which will be described below. A narrow black line or arrow represents a fast move in FIG. 4.

In tap 62, the user taps a location on the display. The large black dot represents a tap in FIG. 4. In fast move & return 63, the user starts the fast move, but before lifting up the finger, the user returns the finger to a location close to where it has started. The tap & fast move 64 is a combination of the tap 62 and the fast move 61, where the user performs the tap 62 and then quickly performs the fast move 61. In double tap 65, the user taps the touch screen twice quickly, that is, within a predetermined time period. In triple tap 66, the user taps the touch screen three times quickly. The fast move & flip 67 is a combination of the fast move 61 and a flip at the end of the fast move. The user moves the finger fast and then reverses fast forming an angle α, which is preferably, 0 to 170 degrees, and more preferably, 0 to 90 degrees.

The following describes examples of gradual selection-enabled flick operations 70, which include clockwise rotation 71, anti-clockwise rotation 72, tap & clockwise rotation 73, tap & anti-clockwise rotation 74, slow move 75, tap & slow move 76, and slow move & tap 77.

Using the gradual selection-enabled flick operation 70, the user is able to gradually select an item among a plurality of items by moving a finger slowly on the touch screen 20 and lifting up the finger at timing associated with the item that the user desires to select. Preferably, during the selection using the gradual selection-enabled flick operation 70, the user is able to move reversely the finger to go back to the previous items many times. This is because the user desires to look into the assist display and adjust the location of the finger, to perform precise operations. A large width arrow in FIG. 4 represents the gradual selection-enabled flick operation 70. Preferably, all gradual selection-enabled flick operations 70 move slower than the fast flick operations 60. In particular, if the motion is slower than a predetermined speed such as 20 mm/second, the motion is recognized as a gradual selection-enabled flick operation. It is advantageous if the user is enabled to set the above speed in a setting screen so as to offer comfortable input for every user. Such a gradual selection-enabled flick operation is included in a flick operation herein.

A flick action is a subset of a flick operation. For example, in a four directions detection approach, there are left, up, right, and down fast move flick actions for a fast move 61 flick operation. Alternatively, in an eight directions detection approach, there are left, upper left, up, upper right, right, lower right, down, and lower left fast moves for a fast move 61. As for a clockwise rotation 71, in a four directions detection approach, there are first 90 degrees rotation flick action, second 90 degrees rotation flick action, third 90 degrees rotation flick action, fourth 90 degrees rotation flick action, fifth 90 degrees rotation flick action, and so on. As described above, the user is able to go back to the second 90 degrees rotation range from the third 90 degrees rotation range if the user reversed the direction of the rotation.

(8) A Form of an Assist Display

Figure 5:
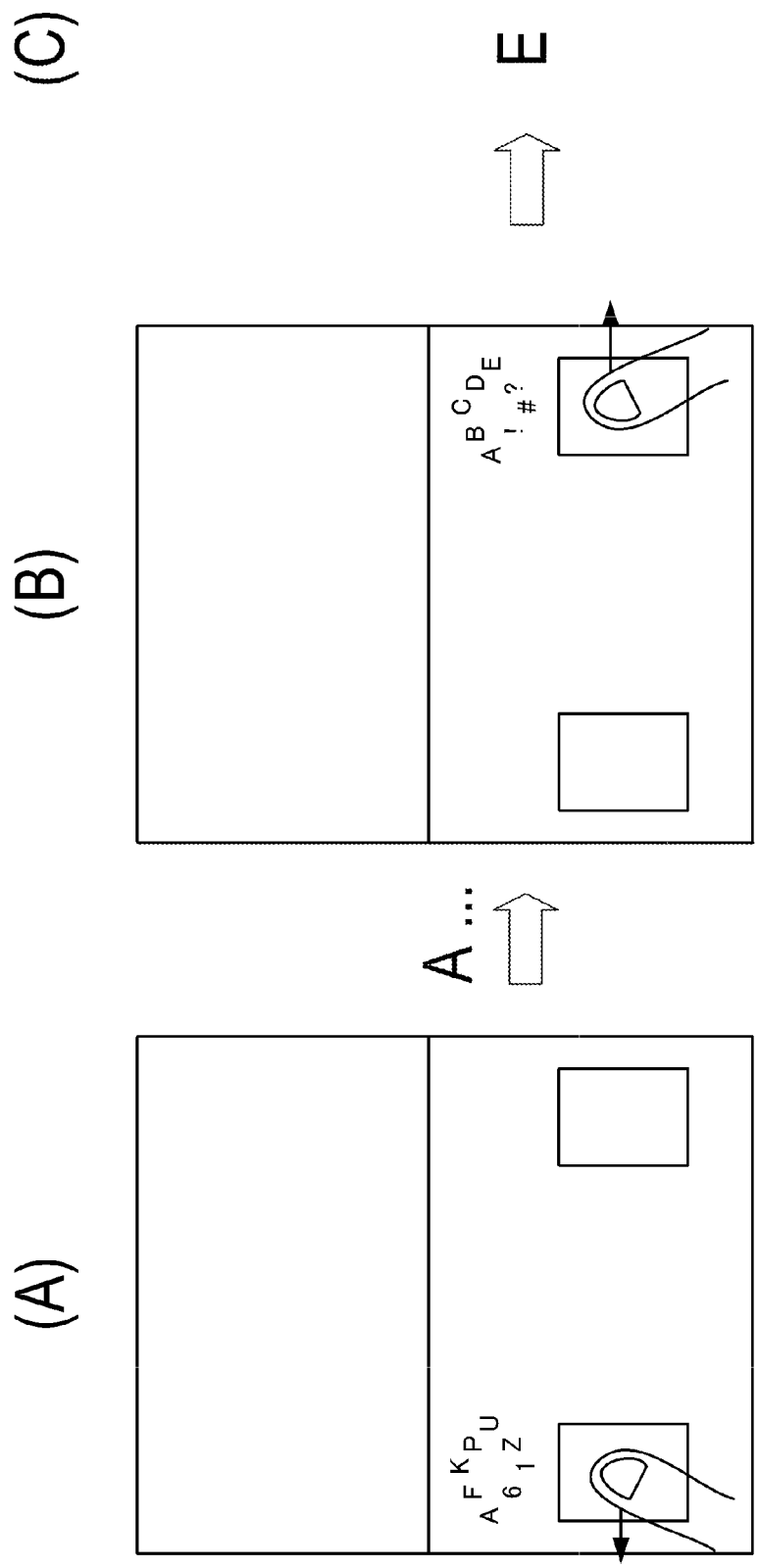
FIG. 5 shows touch display arrangements in accordance with an embodiment using an eight directions approach.

FIG. 5 shows touch display arrangements in accordance with an embodiment using an eight directions approach. As shown in FIG. 5, the assist display 44 may be apart from the flick area 41, 42. In this case, it is advantageous in that the user can see the assist display 44 easily.

(9) Four Directions Approach

FIG. 6 shows touch display arrangements in accordance with another embodiment of the invention using a four directions approach.

Upon the input panel 32 is displayed in the touch screen 10, an assist display 44 that consists of four codes is displayed at each of the first and second flick areas 41, 42. Alternatively, the assist display 44 may be consisted of five codes, one in the middle, which is associated to a tap action. First, the mobile device 10 detects a flick operation of the user at either one of the first and second flick areas 41, 42. For example, if the user desires to select A code series, the user performs a fast move flick action in the left direction at the first flick area 41. Then, the mobile device 10 determines that the user has selected A code series and displays a second-generation assist display (FIG. 6B). Next, the mobile device 10 detects an input of a code at either the first flick area 43 or the second flick area 42. For example, if the user desires to select a code C, the user performs a fast move flick action in the right direction at the second flick area 42 (FIG. 6B).

In this four directions approach, the number of directions for a flick area has become smaller (from eight to four) and the usability may have improved. This approach is made possible by using two flick areas when inputting the (first) code series.

(10) Internationalization

FIG. 7 shows touch screen arrangements according to another embodiment of the invention.

As an example for inputting various kinds of languages, this embodiment is for inputting English alphabets in addition to Greek alphabets. The user selects "α code series" by performing a left move in the left flick area (FIG. 7A). Then, the second-generation codes are displayed on the left and right input assisting display (FIG. 7B). If the user performed a right move in the left flick area (FIG. 7B), a Greek alphabet ε is determined as the input.

(11) Combined Gradual Selection Approach

It should be noted that a combination of a non-gradual selection-enabled flick operation 60 and a gradual selection-enabled flick operation 70 is important in inputting a code. This is because the user desires to input fast by using a non-gradual selection-enabled flick operation 60 and to select gradually with lower degree to master how to input codes by using a gradual selection-enabled flick operation 70.

Figure 8:
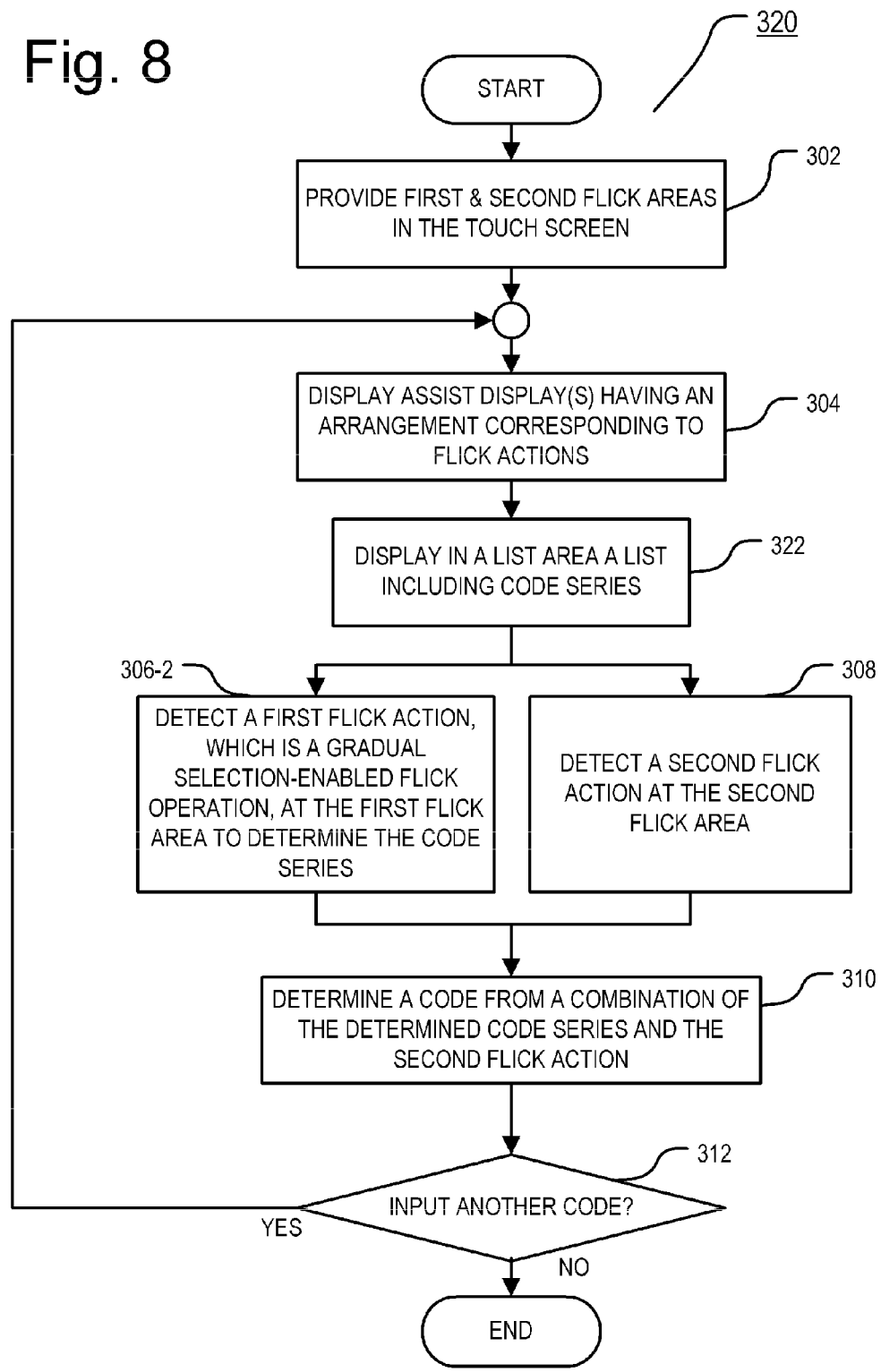
FIG. 8 shows a flow chart of the operation 320 using a list area.

FIG. 8 shows a flow chart of the operation 320 using a list area. The mobile device provides first and second flick areas in the touch screen (Step 302). Then, the mobile device displays assist displays having arrangements corresponding to the flick actions (Step 304) and displays in a list area a list including code series (Step 322). Next, the mobile device detects a first flick action at the first flick area, which is a gradual selection enabled flick operation (Step 306-2), or a second flick action at the second flick area (Step 308). Then, the mobile device determines a code from a combination of the determined code series and the second flick action (Step 310). If the user desires to input another code, the process returns to Step 304 (Step 312). If not, the process ends.

Figure 9:
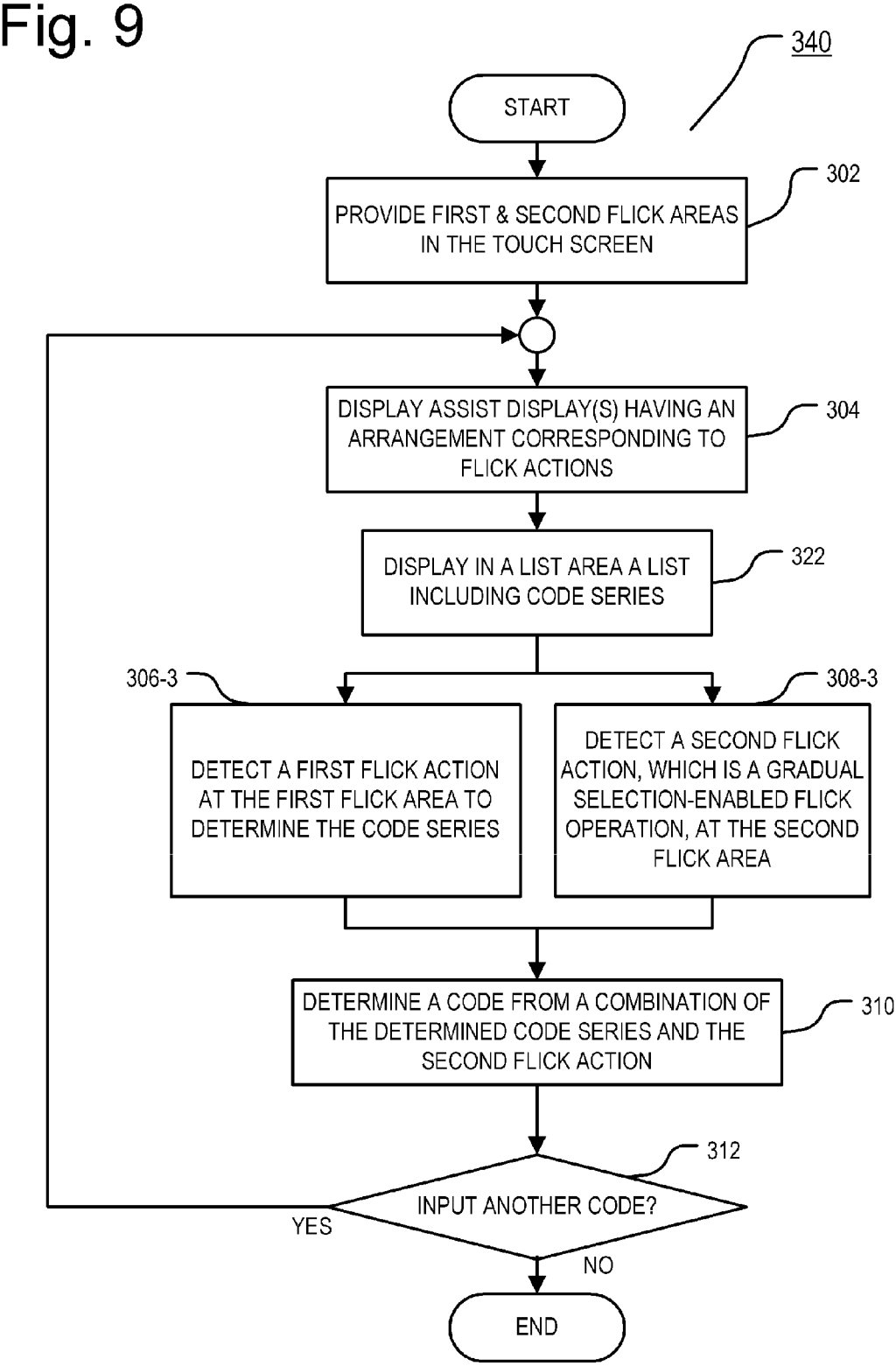
FIG. 9 shows a flow chart of the operation 340 using a list area.

FIG. 9 shows a flow chart of the operation 340 using a list area. The mobile device provides first and second flick areas in the touch screen (Step 302). Then, the mobile device displays assist displays having arrangements corresponding to the flick actions (Step 304) and displays in a list area a list including code series (Step 322). Next, the mobile device detects a first flick action at the first flick area to determine the code series (Step 306-3), or a second flick action at the second flick area, which is a gradual selection-enabled flick operation (Step 308-3). Then, the mobile device determines a code from a combination of the determined code series and the second flick action (Step 310). If the user desires to input another code, the process returns to Step 304 (Step 312). If not, the process ends.

(12) List Area Approach

Figure 10:
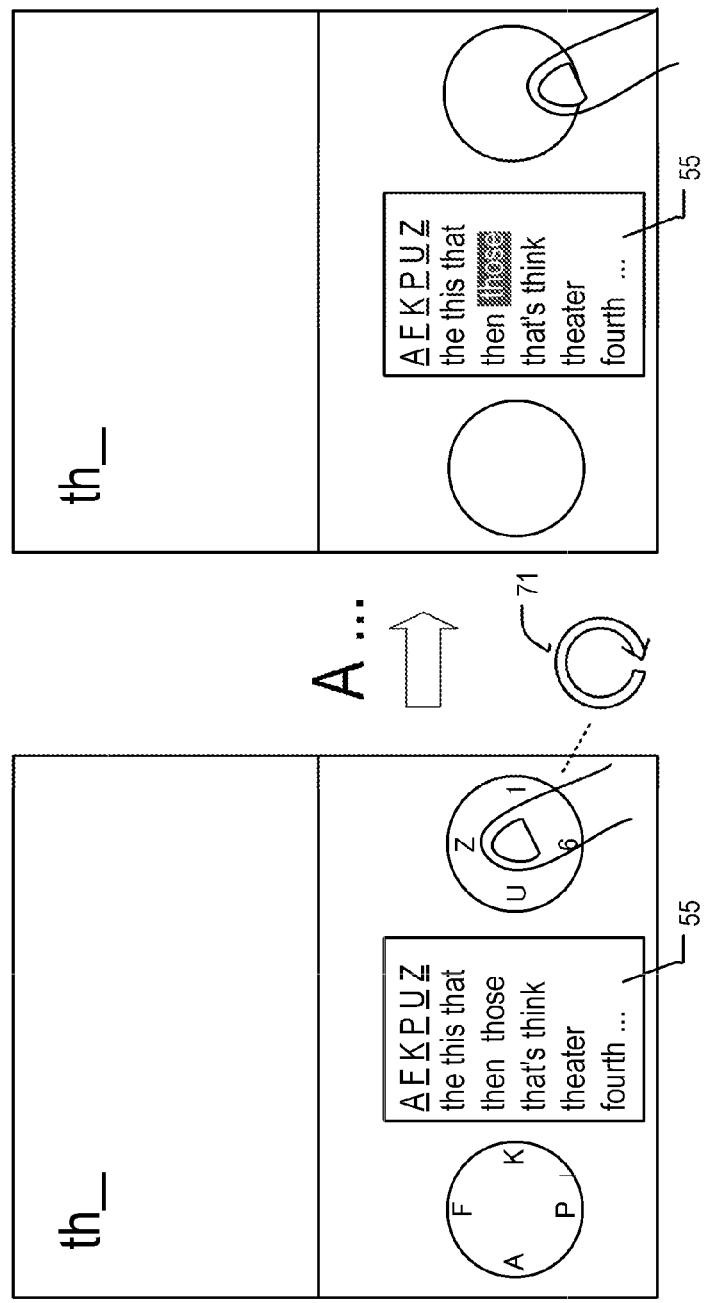
FIG. 10 shows touch screen arrangements according to another embodiment.

FIG. 10 shows touch screen arrangements according to another embodiment of the invention.

During an input operation using the input panel, the mobile device 10 displays at a list area 55 in the touch screen a list of codes that are speculated to be inputted by the user from previous operations of the user or by default as a result of linguistic considerations. Herein, the codes may be displayed using a separator, such as a space code, between the codes. In this case, there may be a plurality of codes in a line, and a code may extend in multiple lines. Alternatively, a single code may be associated with a single line. Preferably, the list area 55 is scrollable, that is, when an item in a lower part of the list or an item lower than that item is attempted to be selected, the list displays lower items, and can be scrollable in the upper part also. Then, the mobile device 10 determines a code among the list of codes in response to detecting a gradual selection-enabled flick action 70 of the user in the flick area.

Figure 11:
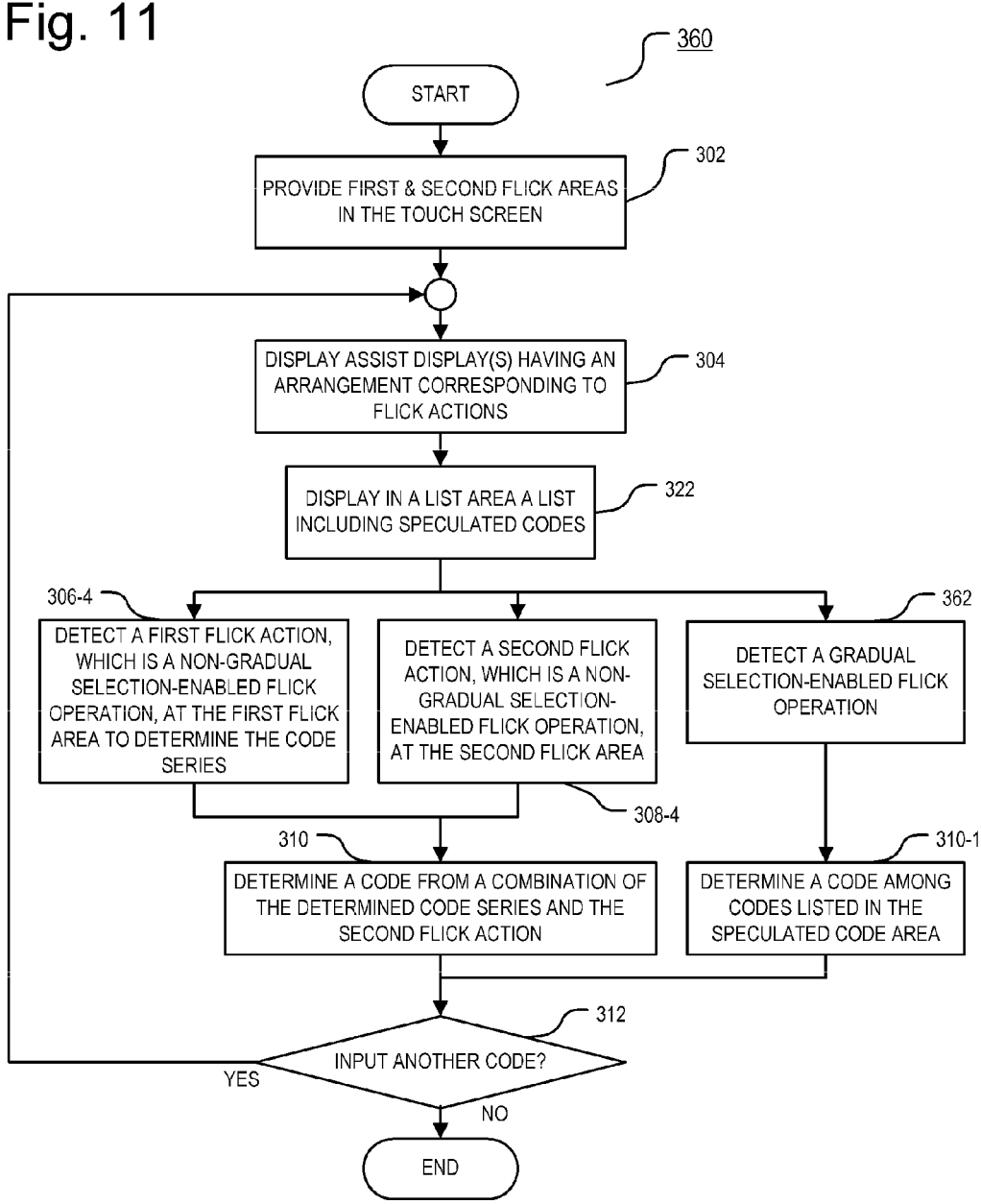
FIG. 11 shows a flow chart of the operation 360 using a combination of non-gradual selection-enabled flick operations and a gradual selection-enabled flick operation.

FIG. 11 shows a flow chart of the operation 360 using a combination of non-gradual selection-enabled flick operations and a gradual selection-enabled flick operation. The mobile device provides first and second flick areas in the touch screen (Step 302). Then, the mobile device displays assist displays having arrangements corresponding to the flick actions (Step 304) and displays in a list area a list including speculated codes (Step 322). Next, the mobile device detects a first flick action at the first flick area, which is a non-gradual selection enabled flick operation, to determine the code series (Step 306-4), or a second flick action at the second flick area, which is a non-gradual selection-enabled flick operation (Step 308-4), or a gradual selection enabled flick operation at either one of the first flick area and the second flick area (Step 362). If there has been a first flick action or a second flick action, the mobile device determines a code from a combination of the determined code series and the second flick action (Step 310). If there has been a gradual selection-enabled flick action, the mobile device determines a code among codes listed in the speculated code area (Step 310-1). If the user desires to input another code, the process returns to Step 304 (Step 312). If not, the process ends.

(13) Two List Areas Approach

Figure 12:
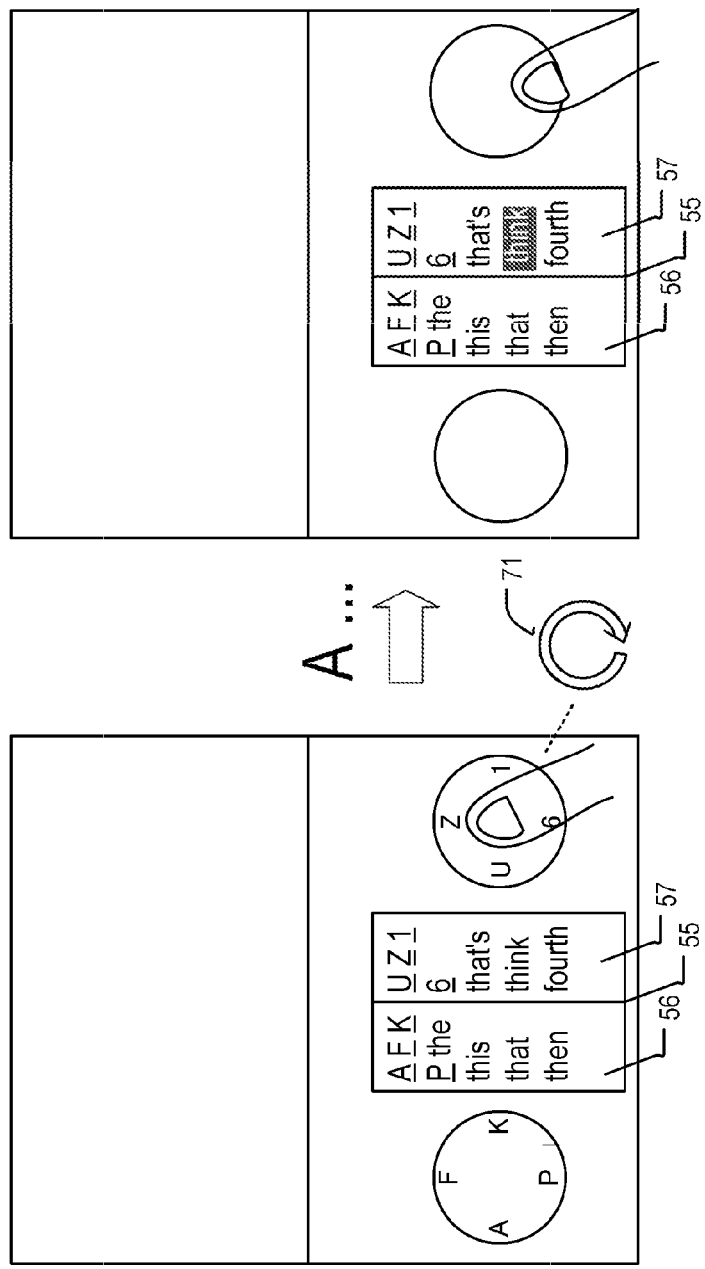
FIG. 12 shows touch screen arrangements according to another embodiment of the invention.

FIG. 12 shows touch screen arrangements according to another embodiment of the invention.

The above List Areas Approach may be expanded to a scheme that use two flick areas for performing multiple gradual selection-enabled flick actions 70.

During an input operation using the input panel, the mobile device 10 displays at a first list area 56 in the touch screen 20 a first list of code series and/or codes, that are speculated to be inputted by the user from previous operations of the user or by default. Then, the mobile device 10 determines a code series or a code among the first list of code series and/or codes in response to detecting a gradual selection-enabled flick action 70 of the user in the flick area. If it is determined that a code is selected by the gradual selection-enabled flick action 70 at a first flick area, the mobile device 10 determines the code as the code to be inputted. Otherwise, if it is determined that a code series is selected by the gradual selection-enabled flick action 70 at the second flick area, the mobile device 10 displays at a first list area 56 in the touch screen a third list of code series and/or codes, that are speculated to be inputted by the user.

If it is determined that a code is selected by the gradual selection-enabled flick action 70 at the second flick area, the mobile device 10 determines the code as the code to be inputted. This process continues until the user selects a code. Using this approach, it is possible for the user to select a code from a very large number of candidate codes. For example, the user may select a code from candidate codes consisting of Chinese characters, Korean characters, or Japanese characters.

FIG. 12 shows touch screen arrangements according to another embodiment. In FIG. 12, at the start, the user has been already inputting characters using the method described in the above in Four Directions Approach and now, alphabets, "th" have been already inputted. However, the user desires to use List Area Approach now. The user starts a clockwise rotation movement using the right thumb slowly. Then, two list areas 55 are displayed on the touch screen, and at the same side of list areas 55, which is right in this case, code series and codes, A, F, K, P, U, Z, "that's", "think", and so on, are sequentially made visually distinguishable from others. In this case, they are highlighted and colored (see "think" in FIG. 12B). Further, code series, A, F, K, P, U, and Z, are made visually distinguishable from codes, such as "the" and "this". In this embodiment, the code series are underlined and colored differently. When the user lifts the finger when the highlight is at "think" (FIG. 12B), the mobile device 10 determines a code, "think", as the input. Instead, if the user selects one of the code series, A, F, K, P, U, and Z, the mobile device 10 updates the two lists in the first and second list areas 56, 57 such that the lists correspond to the selected code series.

Figure 13:
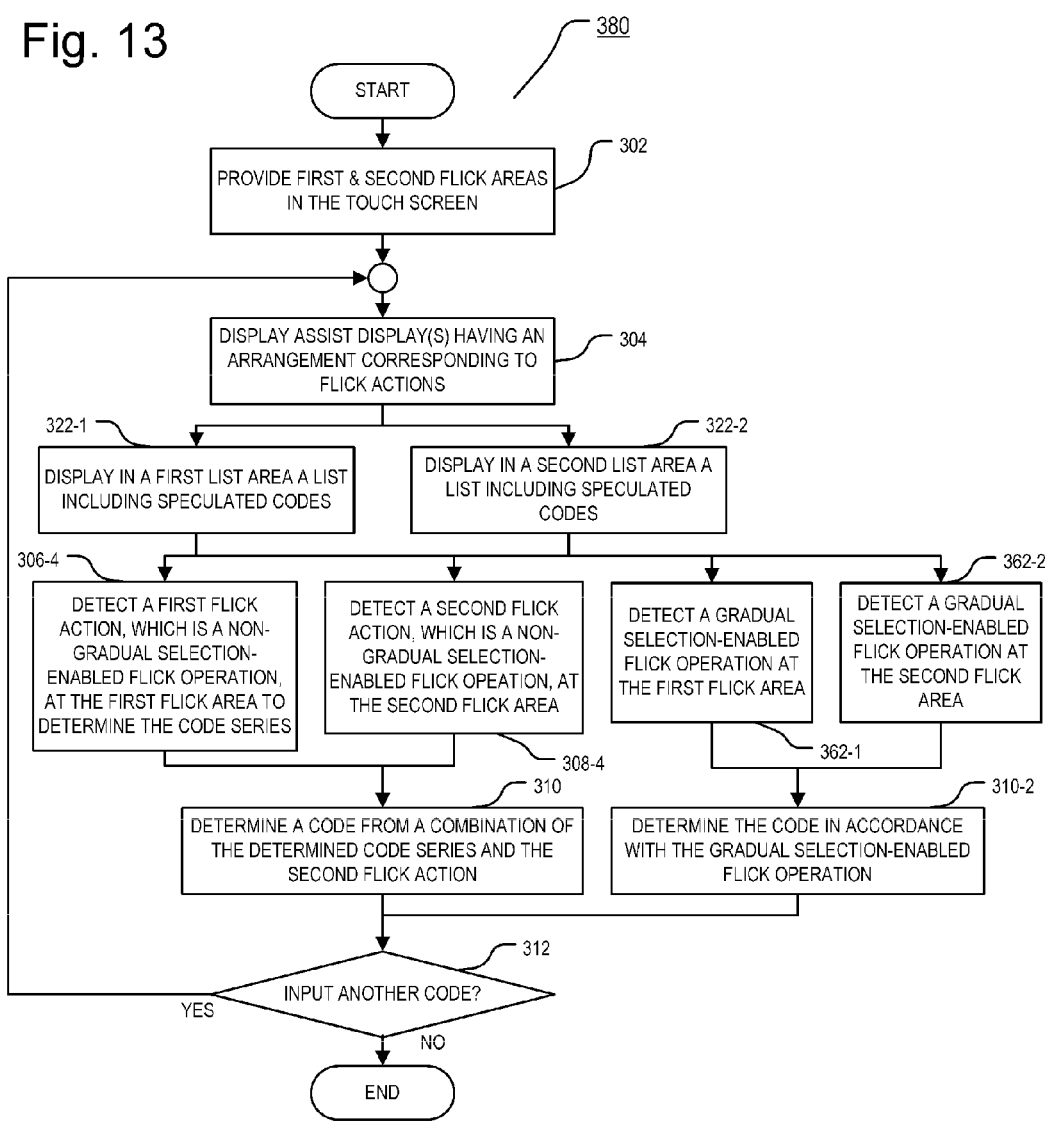
FIG. 13 shows a flow chart of the operation 380 using two list areas.

FIG. 13 shows a flow chart of the operation 380 using two list areas. The mobile device provides first and second flick areas in the touch screen (Step 302). Then, the mobile device displays assist displays having arrangements corresponding to the flick actions (Step 304), and displays in a first list area a list including speculated codes (Step 322-1) and displays in a second list area a list including speculated codes (Step 322-2). Next, the mobile device detects a first or second flick action at the first or second flick area, respectively, which is a non-gradual selection enabled flick operation (Steps 306-4, 308-4), or a gradual selection-enabled flick operation at the first or second flick area (Steps 362-1, 362-2). If there has been a first flick action or a second flick action, the mobile device determines a code from a combination of the determined code series and the second flick action (Step 310). If there has been a gradual selection-enabled flick action, the mobile device determines a code among codes listed in the speculated code area (Step 310-2). If the user desires to input another code, the process returns to Step 304 (Step 312). If not, the process ends.

(14) Double List Area Selection Approach

Figure 14:
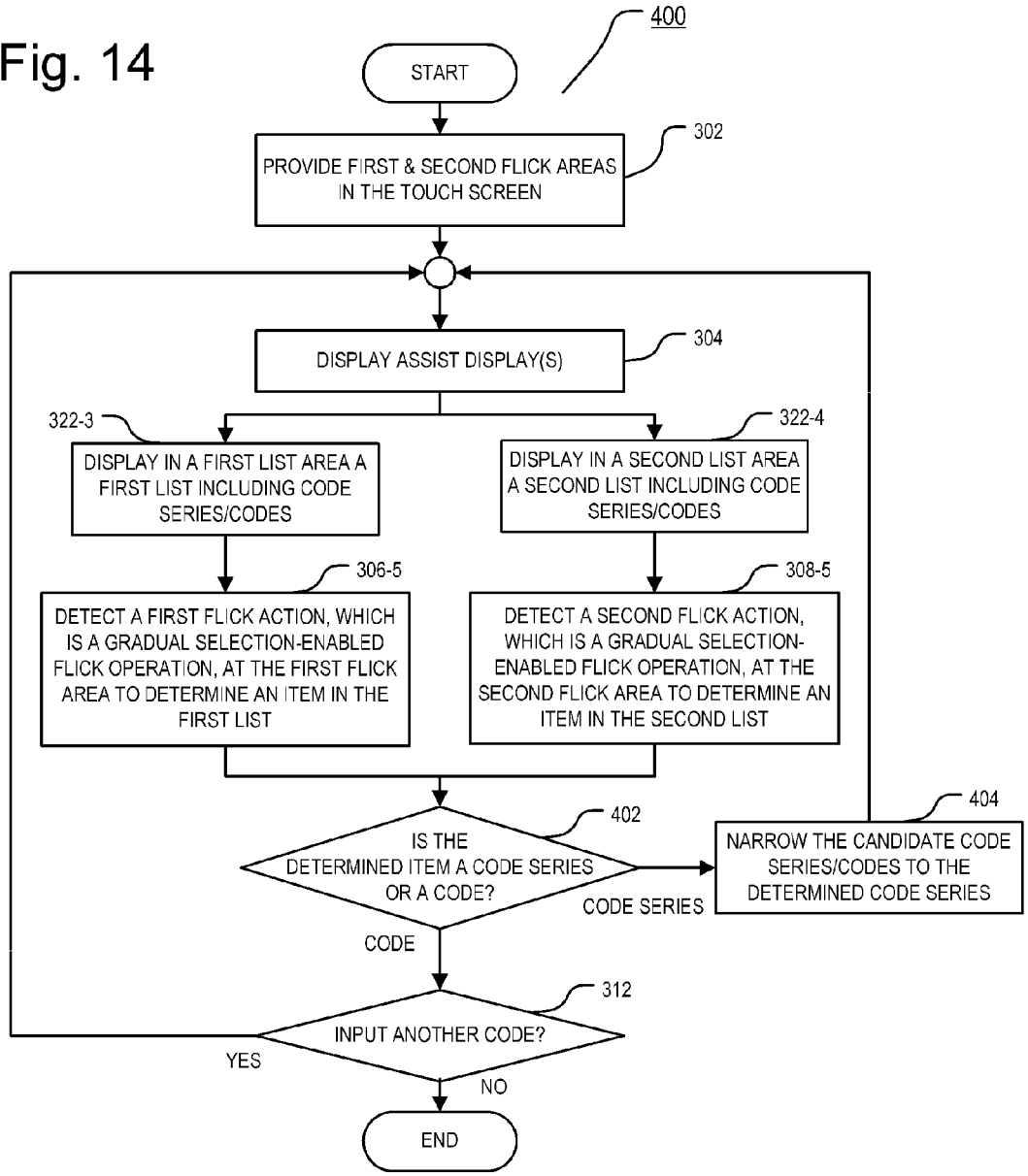
FIG. 14 shows a flow chart of the operation 400 using Double List Area Selection Approach.

FIG. 14 shows a flow chart of the operation 400 using Double List Area Selection Approach. The mobile device provides first and second flick areas in the touch screen (Step 302). Then, the mobile device displays assist displays (Step 304). Next, the mobile device displays in a first list area 56 a first list including code series/codes (Step 322-3). In response to detecting at the first flick area a first flick operation by the user, which is a gradual selection-enabled flick operation, the mobile device determines an item in the first list as an input to the mobile device (Step 306-5). Also, the mobile device displays in a second list area 57 a second list including code series/codes (Step 322-4). In response to detecting at the second flick area a second flick operation by the user, which is a gradual selection-enabled flick operation, the mobile device determines an item in the second list as an input to the mobile device (Step 308-5). If the determined item is code series (Step 402), the mobile device narrows the candidate code series/codes to the code series/codes that are associated with the determined code series (Step 404). If the determined item is a code (Step 402), the mobile device determines the code as the code to be inputted into the mobile device. If the user desires to input another code, the process returns to Step 304 (Step 312). If not, the process ends.

(15) Initial Handwriting Approach

In this embodiment, the mobile device 10 detects an initial handwriting action, which represents a part of a code, preferably, a first part of a code when the user writes the code with the user's hand, as the flick motion. The initial handwriting action preferably includes both fast moves and fast move & flips. Alternatively, the initial handwriting action may include fast moves only.

FIG. 15A shows examples of initial handwriting actions 58 for English alphabets. A black circular dot represents a location to put the finger down initially. FIG. 15B shows examples of initial handwriting actions 58 for numbers. FIG. 15C shows examples of initial handwriting actions 58 for Chinese character numbers as examples of Chinese characters. Details of this approach will be described now. Candidate codes are divided into groups by similar groups of the initial handwriting shape of the code. This group is considered as a code series in this embodiment.

The user performs the initial handwriting action 58 at a first flick area 41. Then, the mobile device 10 speculates codes that are likely to be inputted by the user from the initial handwriting action at the first flick area to display a list of codes on the list area 55. Next, the user performs a gradual selection-enabled flick operation at a second flick area to select a code among the codes listed in the list area 55. The mobile device 10 determines the code as the code to be inputted. Needless to say, instead of using the list area 55, the four directions non-gradual selection enabled flick operation approach may be used.

Figure 16:
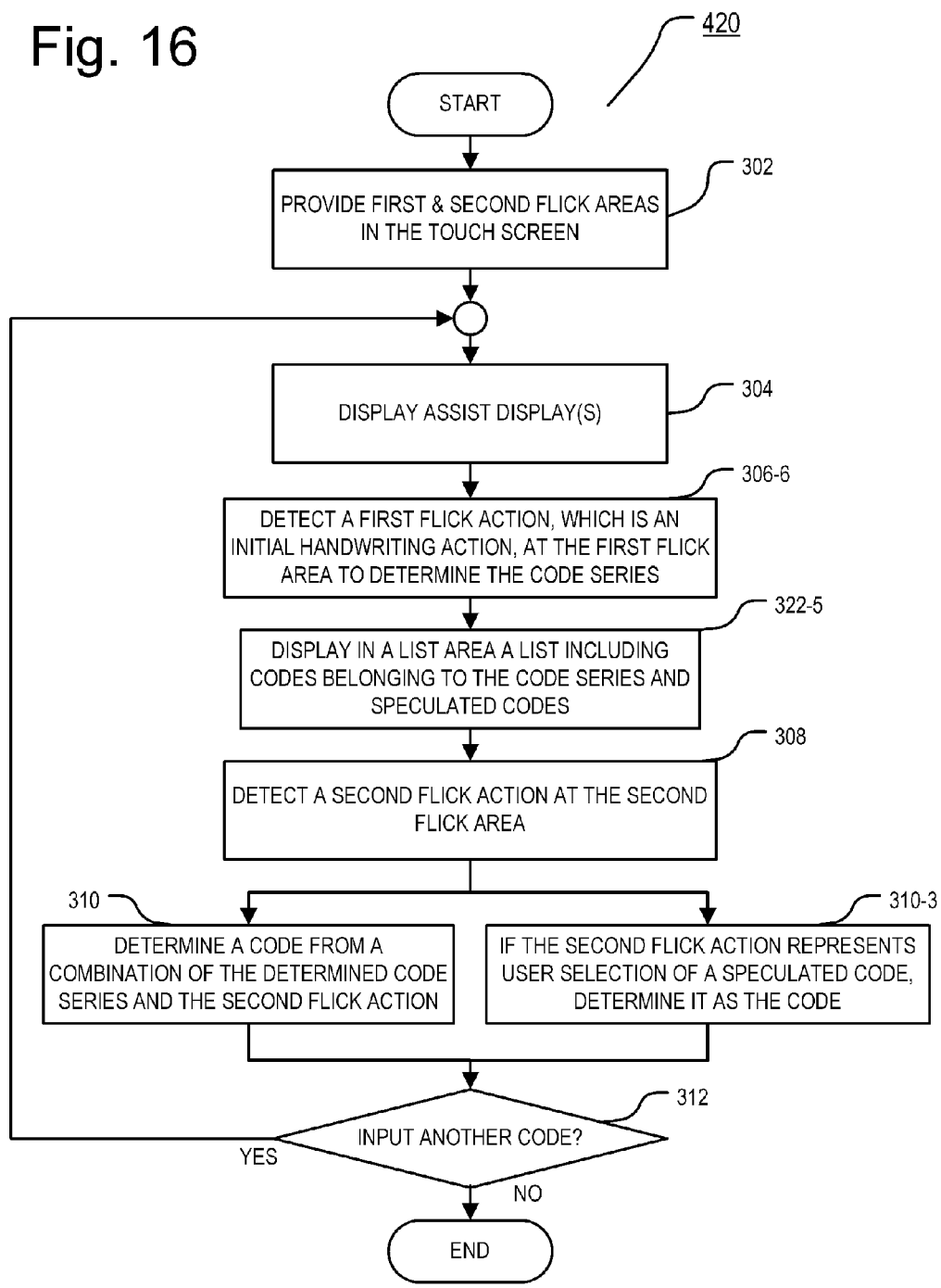
FIG. 16 shows a flow chart of the operation 420 using initial handwriting actions.

FIG. 16 shows a flow chart of the operation 420 using initial handwriting actions. The mobile device provides first and second flick areas in the touch screen (Step 302). Then, the mobile device displays assist displays (Step 304). Next, the mobile device detects a first flick action, which is an initial handwriting action, at the first flick area to determine the code series (Step 306-6). In response to the detection, the mobile device displays in a list area a list including codes belonging to the code series and speculated codes (Step 322-5). Then, the mobile device detects a second flick action at the second flick area (Step 308). If the second flick action does not represent user selection of a speculated code, the mobile device determines a code from a combination of the determined code series and the second flick action (Step 310). If the second flick action represents user selection of a speculated code, the mobile device determines the selected code as the input (Step 310-3). If the user desires to input another code, the process returns to Step 304 (Step 312). If not, the process ends.

(16) "Multiple Flick Areas at a Side" Approach

Figure 17:
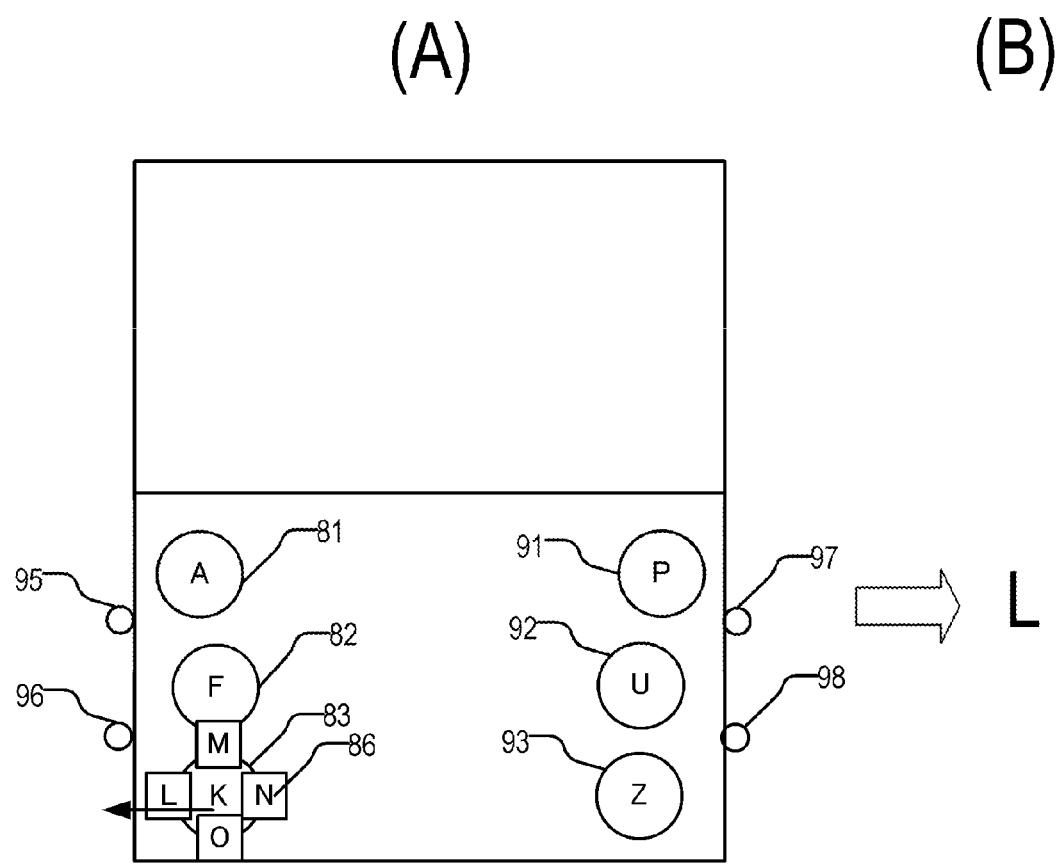
FIG. 17 shows a touch screen arrangement according to an embodiment.

FIG. 17 shows a touch screen arrangement according to an embodiment of the invention.

The mobile device 10 has multiple flick areas at each of the two lateral sides 24, 25 of the touch screen 20. Preferably, the number of the flick areas at each of the two lateral sides 24, 25 is three. This scheme is advantageous in that it is suitable for eliminating a second flick action (although not required) and maintaining the number of flick areas to a small number at the same time.

Alternatively, the number may be five (or more). This scheme is advantageous in that the ten numbers, 0 to 9, which are used for inputting numbers, can all be assigned to one of the flick areas by splitting into two sides. This scheme is also advantageous in inputting Japanese codes since all of typical ten Japanese code series consisting of "a", "ka", "sa", "ta", "na", "ha", "ma", "ya", "ra" and "wa" can be assigned to one of the flick areas.

In FIG. 17, a first left flick area 81, a second left flick area 82, and a third left flick area 83 are first flick areas 41, and a first right flick area 91, a second right flick area 92, and a third right flick area 93 are second flick areas 42. In order to better match with user's finger movement, that is, to decrease the difference between the route of finger movement and the arrangement of the flick areas, the second left flick area 82 is farther apart from the left lateral side than the first left flick area 81, and the third left flick area 83 is farther apart from the left lateral side than the second left flick area 82. Further, the second left flick area 82 locates at the center side from a straight line between the first left flick area 81 and the third left flick area 83. The right flick areas 91-93 are symmetrical to the left flick areas 81-83 centering on the center longitudinal line 34 (FIG. 1B).

At the frame 21 of the mobile device 10, a first roughness 95 and a second roughness 96 are located beside the left lateral side of the touch screen. These roughness are for the user to recognize the locations of the first left flick area 81, the second left flick area 82, and the third left flick area 83. A third roughness 97 and a fourth roughness 98 are located for the same reason. The roughness should be recognizable by the user's finger and may be made by a convex groove or a projection. The roughness may be created inside the touch screen for further precise operations.

Figure 18:
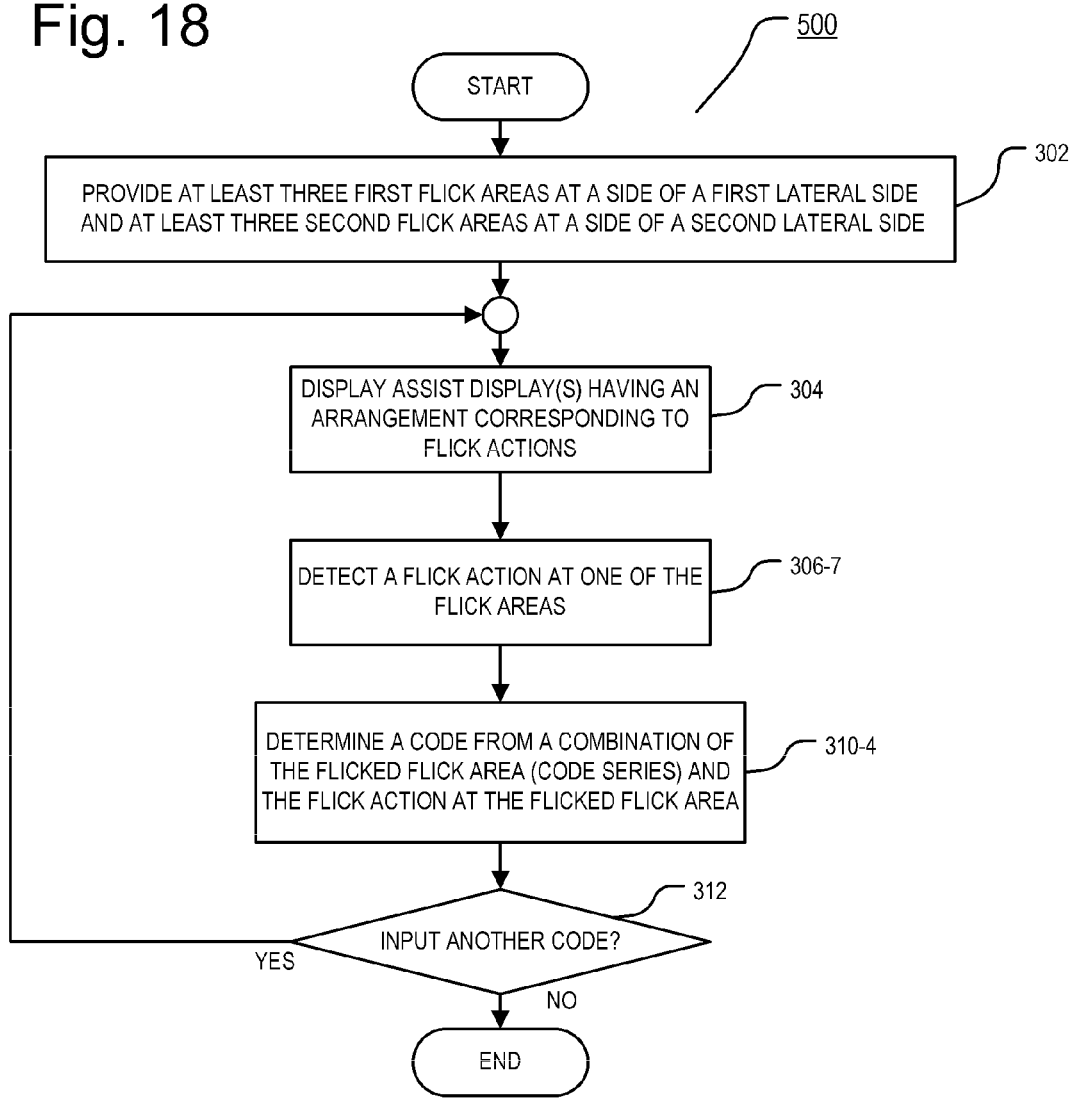
FIG. 18 shows a flowchart of the operation 500 using at least three flick areas at a side.

FIG. 18 shows a flowchart of the operation 500 using at least three flick areas at a side. The mobile device provides at least three first flick areas at a side of a first lateral side of the touch screen and at least three second flick areas at a side of a second lateral side of the touch screen (Step 302). The mobile device displays assist displays having arrangements corresponding to flick actions (Step 304). Then, the mobile device detects a flick action at one of the flick areas (Step 306-7). In response to the detection, the mobile device determines a code from a combination of the flicked flick area (code series) and the flick action at the flicked flick area (Step 310-4).

With this approach, a second flick action can be eliminated, enabling a fast input of codes.

Referring back to FIG. 17, the user starts a first flick action at one of the flick areas. In this example, it is the third left flick area, which is associated with K code series. Then, an assist display 86 is displayed to let the user know the directions to make a flick action.

The mobile device 10 detects a first flick action at the third left flick area (Step 306-7). In this example, the kind of the first flick action is a left fast move. Then, the mobile device 10 determines a code from a combination of which of the flick areas is flicked and the kind of the first flick action at the flicked flick area (Step 310-4) to obtain a code "L". If the user performed a tap instead of a left flick action, "K" is inputted into the mobile device 10.

This approach is advantageous in that it is possible to input codes fast by eliminating the second flick action (although the second flick action may not be eliminated).

This approach may be used with a list area 55. Items in the list area 55 may be displayed in an arrangement corresponding to the six flick areas. For example, the items may be displayed inside or near each of the six flick areas. In this case, a double tap (or other flick operations) at one of the flick areas determines a corresponding item in the list area 55. It should be noted that the list area 55 of the invention does not need to be "listed". It may be of any form in which items are displayed.

(17) Note

In the above embodiments of the invention, each text input methods can be divided into several parts (e.g., code series selection part and code selection part). Although not all of the combinations are described herein, each of all the combinations of the parts constructs an embodiment of the invention and is incorporated herein. Moreover, the descriptions described for one of the embodiment can be applied to other embodiments as may be understood by one skilled in the art.

Further, the input panel may extend at all area of the touch screen 20 and the input panel may be made visually distinguishable from its underlying display layer by displaying the input panel with transparent colors.

What is claimed is:

1. A method for inputting text in a mobile device using a touch screen by inputting a code into the mobile device among candidate codes, wherein the candidate codes are divided into a plurality of code series, the method comprises:

providing in the touch screen at least three first flick areas, which are located in a ⅓ side area at a side of a first lateral side of the touch screen;
providing in the touch screen at least three second flick areas, which are located in a ⅓ side area at a side of a second lateral side of the touch screen at opposite side to the first lateral side,
wherein each of the plurality of code series is associated with one of the flick areas among the first and second flick areas, each of the codes belonging to a code series is associated with a flick action at the flick area, and a plurality of fast moves to different directions at a flick area are respectively associated with the codes associated with the flick area as flick actions at the flick area;
detecting a flick action at one flick area among the first flick areas and the second flick areas; and
determining a code to be inputted into the mobile device from a combination 20 of the flicked flick area and the flick action.

2. The method according to claim 1, wherein
there are provided at least five first flick areas located in a ⅓ side area at a side of the first lateral side of the touch screen and at least five second flick areas located in a ⅓ side area at a side of the second lateral side of the touch screen,
wherein each of ten numbers, 0 to 9, is assigned to different one of the first flick areas and the second flick areas.

3. The method according to claim 1, wherein
a tap is associated with a code as a flick action.

4. A mobile device having a touch screen and a function to input text by inputting a code into the mobile device among candidate codes, wherein the candidate codes are divided into a plurality of code series, the mobile device includes a program that carries out steps of:

providing in the touch screen at least three first flick areas, which are located in a ⅓ side area at a side of a first lateral side of the touch screen;
providing in the touch screen at least three second flick areas, which are located in a ⅓ side area at a side of a second lateral side of the touch screen at opposite side to the first lateral side,
wherein each of the plurality of code series is associated with one of the flick areas among the first and second flick areas, each of the codes belonging to a code series is associated with a flick action at the flick area, and a plurality of fast moves to different directions at a flick area are respectively associated with the codes associated with the flick area as flick actions at the flick area;
detecting a flick action at one flick area among the first flick areas and the second flick areas; and
determining a code to be inputted into the mobile device from a combination of the flicked flick area and the flick action.

5. The mobile device according to claim 4, wherein
there are provided at least five first flick areas located in a ⅓ side area at a side of the first lateral side of the touch screen and at least five second flick areas located in a ⅓ side area at a side of the second lateral side of the touch screen,
wherein each of ten numbers, 0 to 9, is assigned to different one of the first flick areas and the second flick areas.

6. The mobile device according to claim 4, wherein
a tap is associated with a code as a flick action.

7. The mobile device according to claim 4, wherein
a roughness for informing a location of a flick area to a user is located on the mobile device beside a lateral side of the touch screen.

* * * * *